(12) United States Patent
Vembu

(10) Patent No.: US 6,259,928 B1
(45) Date of Patent: Jul. 10, 2001

(54) SYSTEM AND METHOD FOR OPTIMIZED POWER CONTROL

(75) Inventor: Sridhar Vembu, San Jose, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/164,384

(22) Filed: Sep. 30, 1998

Related U.S. Application Data

(60) Provisional application No. 60/062,821, filed on Oct. 13, 1999, and provisional application No. 60/062,819, filed on Oct. 13, 1997.

(51) Int. Cl.[7] .................................................. H04B 7/00
(52) U.S. Cl. .............................................. 455/522; 455/69
(58) Field of Search .................................. 455/422, 522, 455/69, 70, 127; 370/318

(56) References Cited

U.S. PATENT DOCUMENTS

| | | | |
|---|---|---|---|
| 5,245,629 | * | 9/1993 | Hall ...................................... 455/522 |
| 5,333,175 | | 7/1994 | Ariyavisitakul et al. . |
| 5,386,589 | * | 1/1995 | Kanai ..................................... 455/69 |
| 5,940,430 | * | 8/1999 | Love et al. ........................... 455/522 |
| 6,075,974 | * | 6/2000 | Saints et al. ......................... 455/522 |

FOREIGN PATENT DOCUMENTS

| | | | |
|---|---|---|---|
| 0330166 | 2/1989 | (EP) | .............................. H04B/7/005 |
| 0462952 | 5/1991 | (EP) | .............................. H04B/7/005 |
| 0548939 | 12/1992 | (EP) | .............................. H04B/7/005 |
| 0709973 | 5/1996 | (EP) | .............................. H04B/7/005 |

\* cited by examiner

Primary Examiner—Doris H. To
(74) Attorney, Agent, or Firm—Phillip R. Wadsworth; Gregory D. Ogrod

(57) ABSTRACT

A system and method for optimizing power control provides dynamic adjustment of a power-control threshold thereby allowing transmitter power to be reduced when signal quality is high. In a communication system having at least one mode for controlling the power of a transmitter in the communication system, the threshold level of the system is optimized by determining performance of the communication system based on a predetermined metric such as the system error rate, for example. Additionally, the power of the transmitter or transmitted signal in relation to the threshold of the communication system is determined. The threshold of the communication system is adjusted based on the performance of the communication system and the power of the transmitter in relation to the threshold.

30 Claims, 5 Drawing Sheets

SYSTEM AND METHOD FOR OPTIMIZED POWER CONTROL

CROSS-REFERENCE TO RELATED APPLICATIONS

This application claims benefit of provisional application 60/062,821 Oct. 13, 1999 and provisional application 60/062,819 Oct. 13, 1997.

This application is related to a commonly owned application, filed on even date herewith, entitled "System and Method for Selecting Power Control Modes" and having application Ser. No. 09/164,383 which is incorporated herein by reference.

BACKGROUND OF THE INVENTION

I. Field of the Invention

The present invention relates generally to wireless communication systems. More particularly, the present invention relates to a novel and improved system and method of power control for a wireless communication device.

II. Related Art

Wireless communication networks are enjoying notable popularity in all aspects of business, industry and personal life. As such, portable, hand-held wireless communication devices have experienced widespread growth in recent years. Portable devices such as cellular and Personal Communication Services (PCS) phones are now commonplace for business and personal users alike. Additionally, advanced systems, such as satellite communications systems using portable, hand held and mobile phones, are currently being designed.

One design goal of hand-held communication devices is that of low power consumption. Low power consumption provides extended battery life and lower heat generation which increases device usefulness. Often times, lower power consumption also allows for or leads to smaller device sizes.

In CDMA communication systems, the transmitted power of signals within the system is controlled so as to maintain the amount of power required for any given communication link at a minimum level. This serves to maximize overall communication system capacity and maintain acceptable levels of mutual interference and signal quality. By controlling the transmitted signal power at or near the minimum level, interference with other communication devices or units is reduced. Examples of techniques for power control in such communication systems are found in U. S. Pat. No. 5,383,219, entitled "Fast Forward Link Power Control In A Code Division Multiple Access System," issued Jan. 17, 1995; U.S. Pat. No. 5,396,516, entitled "Method And System For The Dynamic Modification Of Control Parameters In A Transmitter Power Control System," issued Mar. 7, 1995; and U.S. Pat. No. 5,267,262, entitled "Transmitter Power Control System," issued Nov. 30, 1993, which are incorporated herein by reference.

One technique for decreasing the amount of power consumed by the device is to minimize the amount of power in the transmitted signal. Often times, this is accomplished by decreasing the amount of power in the transmitted signal as much as possible without adversely affecting the communication. One way in which this is accomplished is to decrease the amount of power as much as possible without allowing the signal-to-noise ratio (SNR) to fall below an acceptable level. When the SNR falls below the acceptable level, the power is increased to bring the SNR back up to an acceptable level.

This approach is advantageous because it allows a minimum amount of power to be used for communications under optimum conditions. When operating in less than optimum or ideal conditions, that is, inside a building, in bad weather, or such, transmission power is increased to maintain acceptable communications (for example, to maintain an acceptable SNR).

With some systems, such as cellular communications systems or other wireless communications systems for example, the wireless communication device, that is, a cellular phone, is controlled remotely. That is, part of the communication bandwidth between the device and a base station transceiver is dedicated to transferring command and status information. This command and status portion of the bandwidth is used to adjust the power of signals transmitted by the device. When the SNR of signals received by a base station falls below an acceptable level, the base station sends a command to the wireless device to increase its transmitted power. Similarly, if the SNR of received signals is well within acceptable limits, the base station commands the device to decrease transmitter power.

Most conventional systems, however, are limited in the manner in which they control the transmitter power for the wireless communication device. What is needed is a system and method for optimizing power control in a wireless communication system.

SUMMARY OF THE INVENTION

The present invention is a novel and improved system and method for optimizing the setting of a threshold level used to control power of a transmitter in a communication system. According to the invention, two parameters are used to determine whether or not the threshold level needs to be adjusted. These parameters are the operation of the system as compared to an established threshold and the performance of the system.

According to the invention, if the performance of the system is degraded and the system is operating at threshold, this is an indication that the threshold needs to be increased. As such, the invention increases the threshold. Accordingly, the power control portion of the communication system senses that the system is operating below threshold (i.e., the newly-increased threshold) and increases the system power according to a power control mode. As a result, the performance of the system is improved. If the performance is still degraded and the system is again operating at the new threshold, the threshold is increased further. This process continues until the system performance is once again returned to an acceptable level.

Note that if the performance of the system is degraded and the system is operating below threshold, this is an indication that the threshold does not need to be adjusted and that the power of the transmitter needs to be increased to bring the system up to threshold. In one embodiment, this is accomplished by increasing the power of the transmitter according to the power control mode of the communication system.

If system performance is better than required, this is an indication that the power of the transmitter may be greater than needed. Where the system performance is better than required, the invention determines if the system is operating above threshold. If so, the power of the transmitter is decreased according to the power control mode of the communication system. However, if the performance is better than required and the system is operating at or below threshold, this is an indication that the threshold can be lowered. As such, the invention lowers the threshold.

Accordingly, the power control portion of the communication system senses that the system is operating above threshold and decreases the system power according to a power control mode. As a result, the power consumption of the transmitter is decreased. If the performance is still better than required and the system is still operating at or below the new threshold, the threshold is decreased further. This process continues until the system performance is once again returned to a normal level.

Note that if the performance of the system exceeds requirements and the system is operating above threshold, this is an indication that transmitter power should be lowered and that the threshold will likely not require adjustment.

In one embodiment, the threshold determinations are based on the signal-to-noise ratio (SNR) of the received signal at the receiver. A desired SNR level is established as the threshold level. The actual SNR of the received signal is compared to the threshold SNR to determine the operation of the system with respect to threshold.

In one embodiment, system performance is determined based on the error rate of the system. In alternative embodiments other metrics are used to determine system performance such as frame errors, bit error rate, or some other indication of system performance.

An advantage of the invention is that power consumption is reduced as a result of the dynamic adjustment of the threshold. Lowering the threshold where signal quality is high allows the system to reduce transmitter power thereby reducing power consumption. Increasing the threshold where the signal quality is degraded allows the system to maintain an acceptable level of performance.

The features, objects, and advantages of the present invention will become more apparent from the detailed description set forth below when taken in conjunction with the drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

I. Overview and Discussion of the Invention

The present invention is directed toward a system and method for optimally determining a threshold level used to regulate the power of signals transferred within a communication system, or devices operating in the system, according to one or more power control modes. The manner in which this is accomplished is described below.

II. Example Environment

Before describing the invention in great detail, it is useful to describe an exemplary environment in which the invention can be implemented. In a broad sense, the invention can be implemented in any wired or wireless communication system, especially one in which it is desirable to control the amount of power provided by a transmitter. Such environments include, without limitation, cellular communication systems, personal communication systems, satellite communication systems, and many other known systems.

Figure 1:
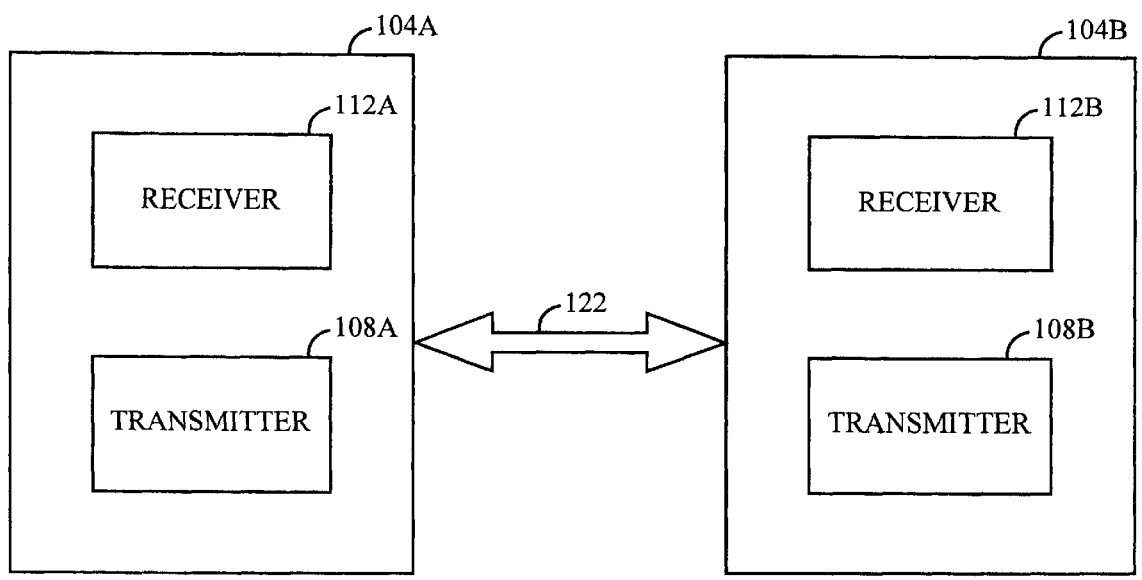
FIG. 1 is a block diagram illustrating an example communication system.

FIG. 1 is a diagram illustrating an example communication system 100. Referring to FIG. 1, the example communication system has two transceivers 104a and 104b. Transceivers 104a and 104b each have a transmitter 108a and 108b, and a receiver 112a and 112b, respectively.

Data or other information is transmitted from a transmitter 108 (108a, 108b) to a receiver 112 (112b, 112a) in another transceiver 104 (104b, 104a) for which the signal is intended, via transmission path 122. In satellite, cellular, and other wireless communication systems, transmission path 122 is the air. However, the present invention is not limited to such applications, and transmission path 122 can be a wire or other signal transfer medium known in the art.

In some environments, transmission path 122 is a packetized data path in which the data are transmitted in data packets. This is usually the case where the information is in the form of digital data. In other environments, analog data are modulated onto a carrier and transmitted across transmission path 122.

In the example of a cellular communication system, one transceiver 104 (104a, 104b) can be, or is located in, a hand-held or mobile cellular telephone and the other transceiver 104 (104b, 104a) is located in a base station at a local cell site that is providing service in the wireless device's or phone's current area, or physical location. In the example of a satellite communication system, one transceiver 104 (104a, 104b) can be a hand-held, mobile, or fixed transceiver (that is, a satellite telephone) and the other transceiver 104 (104b, 104a) is located in a gateway (or an earth station gateway). In the satellite communication system example, a satellite (not illustrated) is used to relay signals between transceivers 104 (104b, 104a), as is well known in the art. Alternatively, in the satellite communication system example, one transceiver 104 can be located on-board the satellite itself.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments, where the power of a wireless device is or can be remotely controlled.

III. Power Control

In a communication system, power can be controlled using a power control scheme referred to as a "power control mode." For the purpose of this discussion, there are at least two modes of power control: "tracking mode" and "burst mode." Both the tracking mode and burst mode of power control provide increases in power when system performance falls below an acceptable level. However, in burst mode, the amount of the power increase is greater than that provided in the tracking mode.

Selection between the tracking mode and the burst mode is accomplished based on the system performance of the communication link. Specifically, if the system performance is within a preselected nominal range, the tracking mode is utilized. If, however, system performance falls below this nominal range, the burst mode of power control is utilized. Utilization of the burst mode brings the system performance to the nominal range more quickly than would otherwise be the case for the tracking mode.

Thus, the tracking mode is well suited to controlling power in nominal operating conditions where the SNR is varying by small amounts above and below the threshold level. In contrast, burst mode is well suited for controlling power in conditions where large power dropoffs are experienced. Such conditions can result where, for example, the communication path is blocked by a large building or other interfering structure or condition.

In one embodiment, system performance is based on the signal-to-noise ratio (SNR) of a signal transmitted by a transmitter (such as transmitter 108a or 108b). In this embodiment, the tracking mode increases the power in small increments when the signal-to-noise ratio (SNR) falls below an acceptable level. Burst mode also increases the power when the signal-to-noise ratio (SNR) falls below an acceptable level. However, in burst mode, the amount of the power increase is greater than that provided in the tracking mode. Selection between the two modes is accomplished based on how far the SNR falls below the acceptable level. That is, based on whether or not performance of the communication link is considered nominal. In another embodiment, system performance is based on receive signal strength independent of the SNR.

In an alternative embodiment, system performance is based on the number of frames received with errors. In this embodiment, if a receiver receives a large number of frames with errors in a given time period (or a specified number of consecutive frames with errors), the burst mode is selected for controlling power. If, on the other hand, the receiver receives only occasional frame errors, tracking mode is selected.

In one embodiment, the power increase for each mode is incremental. That is, for a given command or decision to increase the power, the power is increased by a preselected incremental amount. Power is not increased again until a subsequent command or decision is made to again increase the power. In an alternative embodiment, for a given command or decision to increase the power, the power increases gradually until a subsequent command is received to terminate the power increase. In either embodiment, burst mode provides a greater increase in power than the tracking mode. That is, the burst mode provides a larger incremental power increase in the first embodiment and a more rapid rate of increase in the second embodiment.

Figure 2A:
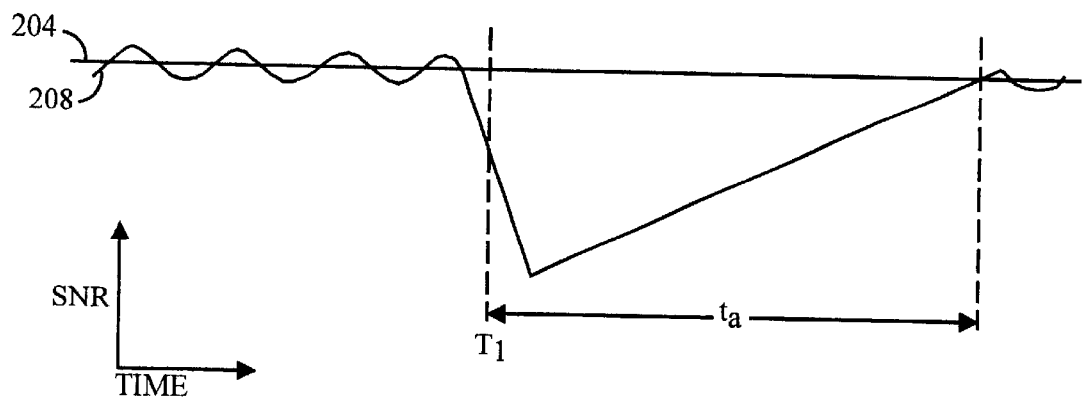
FIGS. 2A and 2B are diagrams illustrating example processes for switching between power control modes.

FIG. 2A is a diagram illustrating an example operational scenario where power is controlled in only the tracking mode. In FIG. 2A, the horizontal axis represents time and the vertical axis represents SNR. The threshold SNR is illustrated by horizontal line 204. An example of the actual SNR of the transmitted signal is illustrated by the time-varying line 208. In the example illustrated in FIG. 2A, the device is operating nominally up until a time $T_1$. In this region, SNR 208 of transmitter 108 is varying by a small amount about SNR threshold 204. Adjustments are made to the transmitted power in small increments. When SNR 208 falls below threshold 204, power is incrementally increased. Conversely, when SNR 208 rises above threshold 204, power is incrementally decreased. Power adjustments are made using commands or control and operation techniques known in the art.

At time $T_1$, the SNR for signals traversing transmission path 122 drops significantly. This can occur where, for example, the path is obstructed. In the tracking mode, the power is increased incrementally to improve the SNR. However, because the power is only increased slightly for each increment in the tracking mode, a significant amount of time elapses before the SNR again reaches an acceptable level. This is illustrated by the time duration $t_t$.

Figure 2B:
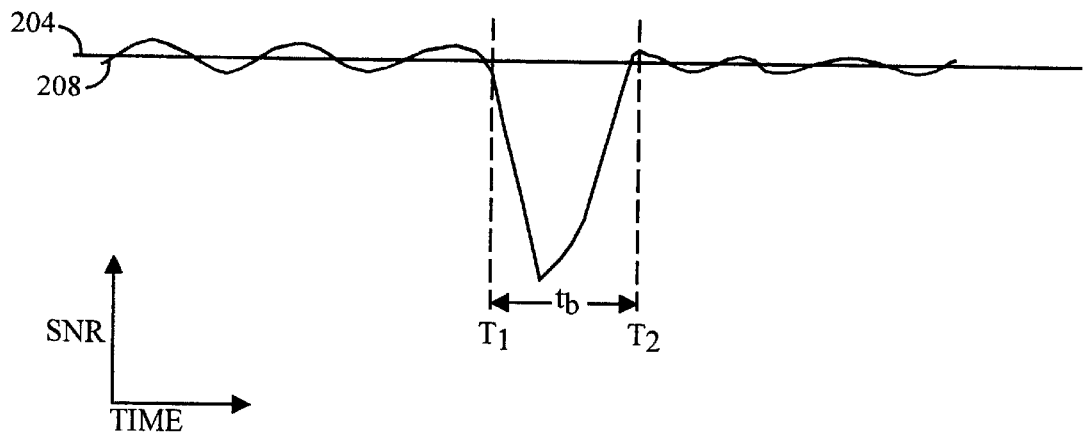

FIG. 2B is a diagram illustrating an example operational scenario where power is selectively controlled in both the tracking mode and the burst mode. As with FIG. 2A, in FIG. 2B the horizontal axis represents time and the vertical axis represents SNR. The threshold SNR is illustrated by horizontal line 204. An example of the actual SNR of the transmitted signal is illustrated by the time-varying line 208. In the example illustrated in FIG. 2B, the device is operating nominally up until time $T_1$. In this region, SNR 208 of a transmitter 108 transmitted signal is varying by a small amount about SNR threshold 204. During this time period, transmitter 108 is operating in the tracking mode and adjustments are made to the transmitted power in small increments. When SNR 208 falls below threshold 204, power is incrementally increased.

At time $T_1$, when transmission path 122 is obstructed and the SNR drops significantly, the transmitter power control mode is switched to the burst mode. As described above, in the burst mode the power increase is more significant than in the tracking mode. As such, the amount of time, $t_b$, that it takes for the SNR to return to an acceptable level is much shorter than the time $t_t$ required in the tracking mode. At time $T_2$ when the SNR 208 reaches threshold 204, transmitter 108 is switched to tracking mode.

Note that it is generally not desirable to remain in the burst mode during nominal operating conditions. This is because a small decrease in SNR would result in a large increase in transmitter power in the burst mode. This would cause SNR 208 to rise well above threshold 204 due to an excess in transmitter power and consume an undue amount of power. This wastes power, and in systems that are power limited, or power affects capacity, this would prove very undesirable. It might also create an oscillatory behavior in some situations when the system tries to compensate and return to the threshold level, overshooting in each direction.

In one embodiment, selection of the power control mode is made by a receiver 112. In this embodiment, receiver 112 (112a, 112b) instructs transmitter 108 (108b, 108a) (of opposite transceiver 104) to switch power control modes when necessary. This can be done, for example, in the command portion of the transmitted signal. In an alternative embodiment, receiver 112 provides information back to transmitter 104 to enable transmitter 104 to make the decision whether or not to switch power control modes. For example, in this alternative embodiment, receiver 112 may send one or more indications such as a frame error indication, a bit error rate value, a SNR value, or some other indication of whether or not the performance of the system is at an acceptable level.

Figure 3:
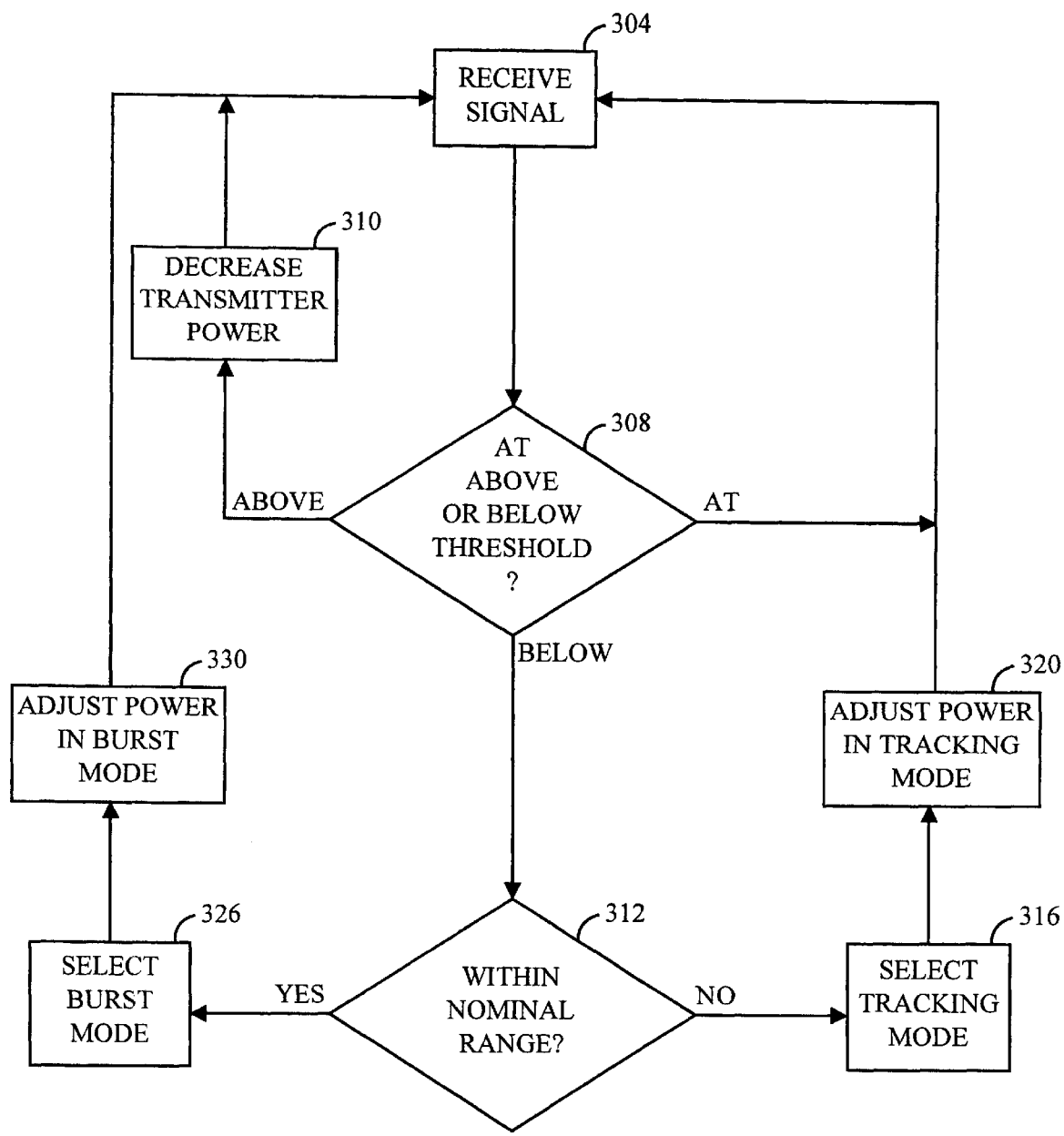
FIG. 3 is an operational flow diagram generally illustrating an example process of determining and selecting an appropriate power control mode.

FIG. 3 is an operational flow diagram generally illustrating a process of determining and selecting an appropriate power control mode according to one embodiment of the invention. In a step 304, receiver 112 (112a, 112b) receives a signal transmitted by transmitter 108 (108b, 108a). In the example environment described above, the signal is transmitted across transmission path 122.

Receiver 112 (112a, 112b) determines whether or not SNR 208 of the received signal is above, at or below preselected threshold 204. This can be done regardless of the power control mode in which the communication system is operating. This decision is illustrated by a decision step 308. If SNR 208 of the received signal is above threshold 204, the power is adjusted down and the operation returns to step 304 where receiver 108 continues to receive the transmitted signal. This is illustrated by step 310 and flow line 362.

If SNR 208 is at threshold 204 and, therefore, no adjustment is necessary, the operation returns to step 304 as illustrated by flow line 364. In one embodiment, threshold 204 is not implemented as a single value, but instead encompasses an acceptable range of SNR values.

If, on the other hand, SNR 208 is below threshold, operation of the invention proceeds to a step 312. In step 312, receiver 112 determines whether or not the degradation in SNR 208 is greater than nominal. In other words, receiver 112 determines whether or not SNR 208 is more than an acceptable amount below threshold 204 and, therefore, the tracking mode is undesirable because it would take longer than desired to return the SNR 208 to threshold 204.

If the degradation in SNR 208 is within nominal limits, the power control mode is selected as the tracking mode as illustrated by block 316. If the power control mode is already the tracking mode, transmitter 108 remains in the tracking mode. However, if the current power control mode is burst mode, block 316 represents a change from burst mode to tracking mode. In a step 320, the power of the transmitter is adjusted in the tracking mode. Receiver 112 continues to receive the transmission as illustrated by flow lines 366, 364.

If the degradation in SNR 208 is beyond nominal limits, the power control mode selected is the burst mode as illustrated by step or block 326. If the power control mode is already the burst mode, transmitter 108 remains in the burst mode. However, if the current power control mode is the tracking mode, step 326 represents a change from the tracking mode to the burst mode. In a step 330, the power is adjusted in the burst mode. Receiver 112 continues to receive the transmission as illustrated by flow line 368.

Thresholds and values below threshold can be chosen to suit a particular application. In one embodiment, threshold 204 is not a single value, but a range of values, such that as long as the received signal is within that range, the signal is said to be at threshold.

In one embodiment, the determination made in steps 308 and 312 is not made based on the SNR per se, but is instead made based on the number of frames received with errors. For example, in one mode of this embodiment, receiver 112 determines how many frames of the past X number of frames was received in error. In this example, if more than Y out of the last X frames were received with errors, this represents an error rate beyond an acceptable range and the preferred power control mode is the burst mode.

In an alternative mode of this embodiment, receiver 112 determines how many consecutive frames were received with errors. If the number of consecutive frames received with errors meets or exceeds a predetermined limit, this represents an error rate beyond an acceptable range and the preferred power control mode is the burst mode. Determining the number of frames received with errors can be accomplished using known techniques such as, for example, by way of a cyclic redundancy check (CRC) code.

In yet another embodiment, the invention looks at the bit error rate (BER) of the received signal. The BER rising above a threshold is analogous to the SNR 208 falling below threshold 204. If the BER rises above a threshold by more than a predetermined amount, the system is no longer operating nominally and the preferred tracking mode is burst mode.

It will become apparent to one skilled in the relevant art how other parameters can be utilized in conjunction with the present invention to determine whether the system is operating nominally.

In the embodiments described above, receiver 112 is described determining whether or not the system is at, above or below threshold and whether the system is operating nominally. In this embodiment, receiver 112 (112*a*, 112*b*) sends a command to transmitter 108 (108*b*, 108*a*) instructing transmitter 108 to change modes when appropriate. In alternative embodiments, receiver 112 simply provides telemetry to transmitter 108. This telemetry provides transmitter 108 with sufficient information to determine whether the preferred power control mode is the tracking mode or burst mode.

In one configuration, the receiver provides two feedback indicators in the form of bits in a message or command. One bit is used to indicate the "tracking mode up/down command" and the other indicates "burst mode transmit level adjustment." It is up to the transmitter to decide what is acted upon or implemented. A decision is made by the transmitter based on factors, such as, but not limited to, the number of consecutive frame errors, etc. In this approach, a faster reaction time is provided for the system because significant events such as errors are immediately reported to the transmitter, at the cost of increased bandwidth consumed for power control purposes.

In an embodiment where receiver 112 commands transmitter 108 to switch power control modes, it is possible that the command will be lost during the transmission. This scenario can be handled using any of several different techniques. One technique uses acknowledgment messages to confirm receipt of the command.

A second technique is to simply continue sending the command. For example, if the system is operating out of nominal bounds, receiver 112 sends a command to track in the burst mode during each command frame until the system has returned to nominal operation. Because the command is repeated, and because this repetition is, in many cases, unnecessary, this technique consumes more bandwidth than is required. For this reason, this technique may be undesirable.

According to yet another technique, the implementation or not of a power control change or command is simply ignored. That is, there is no checking to determine whether transmitter 108 has indeed switched power control modes as commanded. Although this embodiment may seem counterintuitive, it is actually a preferred embodiment. To understand why, consider two situations in which a command to switch modes can be sent by receiver 112 and not received by transmitter 108. In a first situation, SNR 208 has decreased substantially and receiver 112 commands transmitter 108 to switch power control modes to the burst mode. If transmitter 108 does not receive this command, the only negative result is that transmitter 108 continues to control the power in the tracking mode. That is, it takes longer to return to nominal operation than would otherwise be the case if the command were received by transmitter 108.

In a second situation, transmitter 108 is operating in the burst mode and the signal has returned to the nominal range. If transmitter 108 does not receive the command from receiver 112 instructing a change to the tracking mode, power may be increased greater than otherwise required. However, this is not a fatal error as the system continues to operate. The only disadvantage is that more power is being consumed than would otherwise be required.

After reading the above description, it would be apparent to one skilled in the relevant art how to implement power control mode selection using alternative modes of power control in place of or in addition to the tracking mode and the burst mode.

IV. Threshold Optimization

As described above, most power control schemes rely on a comparison of a communication system parameter (i.e., such as SNR, power level, etc.) with a threshold value for that parameter. However, there are circumstances in which a communications system can be operating at or near threshold and still experience an unwanted level of errors or dropouts. In such circumstances, the established threshold level is too low to achieve acceptable communications.

One gauge used to judge the acceptability of the communication channel is called the "quality" of the signal. Where the signal is of high quality, the system can operate at or near a given threshold level without experiencing a significant decrease in system performance. However, where the signal quality is diminished, operation at or near the same threshold level can result in an unacceptable level of system performance. In other words, a communication system with a higher quality signal can operate at a lower threshold level and still maintain a given level of system performance.

One scenario which may affect the quality of a signal occurs when, for example, a portable or mobile communication device is operating in an area where there are obstructions to the signal. For example, consider a user traveling with a portable communication device from a rural farming area to a large city. While the user is in the rural area, there are few obstructions, if any. In this setting, the quality of the signal is high and operation at a given threshold is acceptable.

When the user enters the large city, several tall buildings obstruct the communication path. As a result of these obstructions, the signal reaching the receiver from the portable communication device will be of diminished quality. As a result, an increased number of errors are likely to occur even when the device is operating at threshold and performance of the system is diminished. To compensate for this reduced quality it would be desirable to increase the power of the portable communication device's transmitter so that operation is above threshold. However, if the portable communication device is operating with a conventional power control scheme, power will not be increased above threshold. Therefore, the present invention increases the threshold level, resulting in the power control mode increasing the transmitter's power.

The present invention increases the threshold level of the system so that the power control mode increases the power of the transmitter. According to the invention, the power control mode operates to maintain the signal level, here, the SNR, at or near the threshold level. Additionally, the invention monitors system performance (such as error rate, for example) to maintain and update the threshold level, thereby maintaining an acceptable level of performance.

In operation, the invention determines whether or not the threshold level needs to be revised. According to one embodiment, this determination is made based on two factors: the amount of difference between the signal level and the threshold, and on a predetermined metric of system performance such as, for example, the error rate of the system. If the signal level is at or near threshold, and system performance is unacceptable (an undue number of errors are received, for example), this may be an indication that the threshold needs to be increased. Similarly, if the signal is at or near threshold and the system performance is much better than expected (the error rate is much lower than an established tolerable level, for example), the threshold can be lowered, thereby conserving transmitter power.

Preferably, in one embodiment the signal level measurement is a comparison of SNR 208 with the SNR threshold 204; and the metric used to determine system performance is an error determination made based on the number of errors in the received signal or on the number of frames received with errors over the last N frames. After reading this description it will become apparent to a person skilled in the relevant art that the present invention can be implemented with different parameters for signal strength and/or a different metric to determine system performance. For example, signal level can be signal strength without regard to the noise level or some other operating parameter. Additionally, the error determination used as the system performance metric can be made based on the number of errors in the received signal, the frame error rate, number of consecutive frame errors, bit error rate, or other factors.

Figure 4:
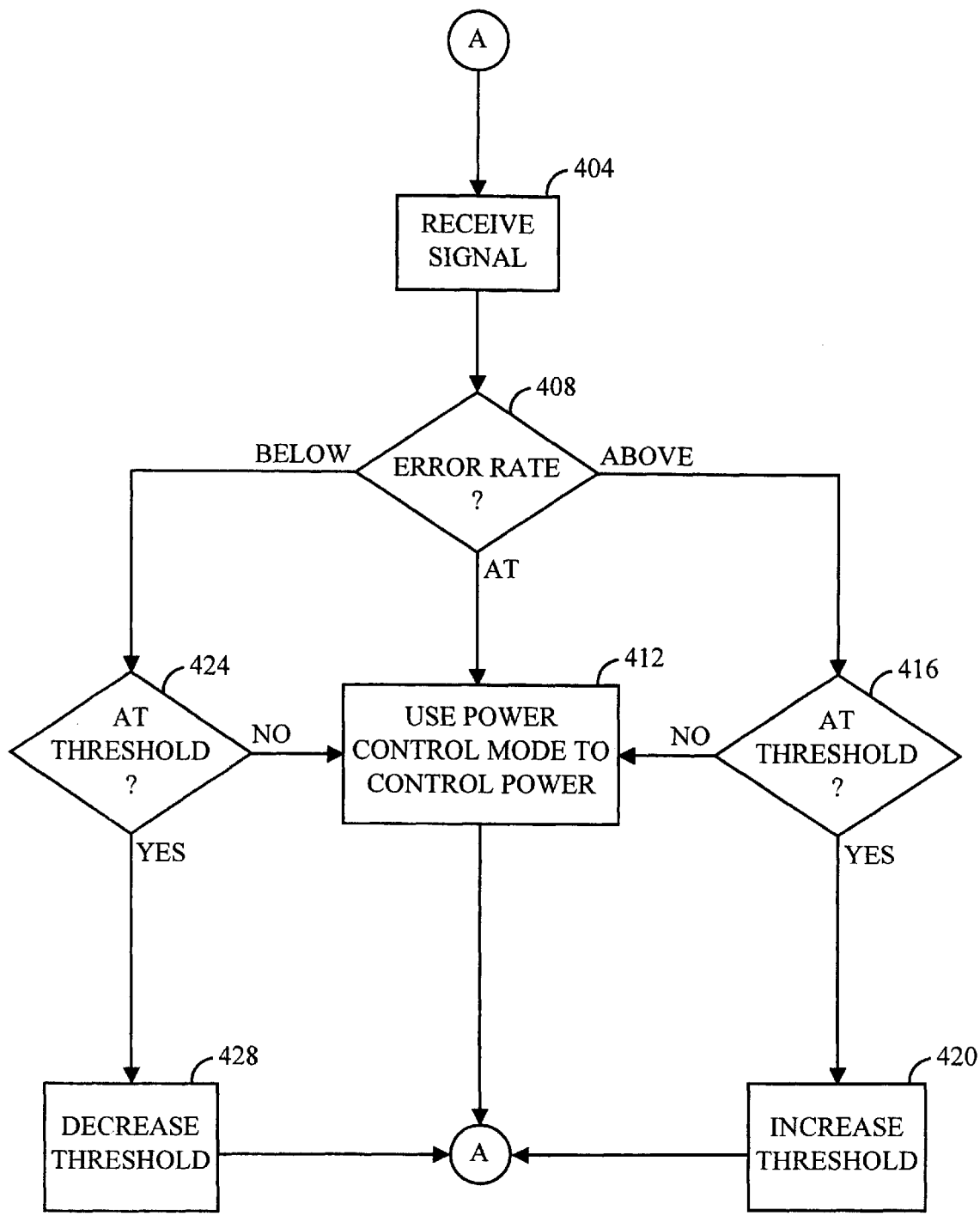
FIG. 4 is an operational flow diagram illustrating a process by which the invention determines whether or not to increase the threshold level according to one embodiment of the invention.

FIG. 4 is a diagram illustrating a process by which the invention determines whether or not to increase the threshold level according to one embodiment of the invention. Referring now to FIG. 4, in a step 404, receiver 112 receives a signal from transmitter 108 and evaluates the signal parameters. As described above, in the preferred embodiment, these parameters are SNR 208 and the number of frame errors received in the last N frames. For ease of description, the process is described in terms of these parameters even though other parameters can be utilized as described above.

In a step 408, the system examines the number of frame errors occurring in the last N frames to determine whether the number of frame errors is acceptable. If the number of frame errors occurring in the last N frames is above an established number, this indicates that system performance is below an established level of acceptability. In one embodiment N =300, although N could be chosen as any number.

If the number of frame errors occurring in the last N frames is at an expected level (or within an acceptable range), the system continues to operate as normal using the power control mode to control the power. This is illustrated by a step 412.

If the number of frame errors occurring in the last N frames is above the established number (or range), the operation continues to a step 416 where the invention determines whether or not SNR 208 is nominal. That is, whether SNR 208 is sufficiently close to threshold 204. In one embodiment, this determination is made by measuring the integrated difference between the measured received signal SNR 208 and threshold 204.

If SNR 208 is at or near threshold 204 and the error rate is unacceptable (as determined above in step 408), this indicates that threshold 204 needs to be increased. This occurs in a step 420.

However, if SNR 208 is below threshold 204 and the error rate is unacceptable (as determined above in step 408), this indicates that the power control mode is operating normally. Because it is likely that the condition of SNR 208 being below threshold 204 resulted in the unacceptably high error rate (determined in step 408 above), threshold 204 is not increased. As such, the system continues to operate as normal using the power control mode to control the power in step 412.

Returning now to step 408, if it is determined in step 408 that the number of frame errors occurring in the last N frames is below an expected number (or range), this is an indication that threshold 204 may be too high. Therefore, in a step 424 the system determines whether or not SNR 208 is at or near threshold 204. In one embodiment, this determination is made by measuring the integrated difference between the measured received signal SNR 208 and threshold 204.

If SNR 208 is above threshold, the power control mode will lower the power to maintain the system properly. However, if SNR 208 is at or near threshold and the error rate is better than expected, this indicates that threshold 204 can be lowered. This occurs in step 428.

Figure 5:
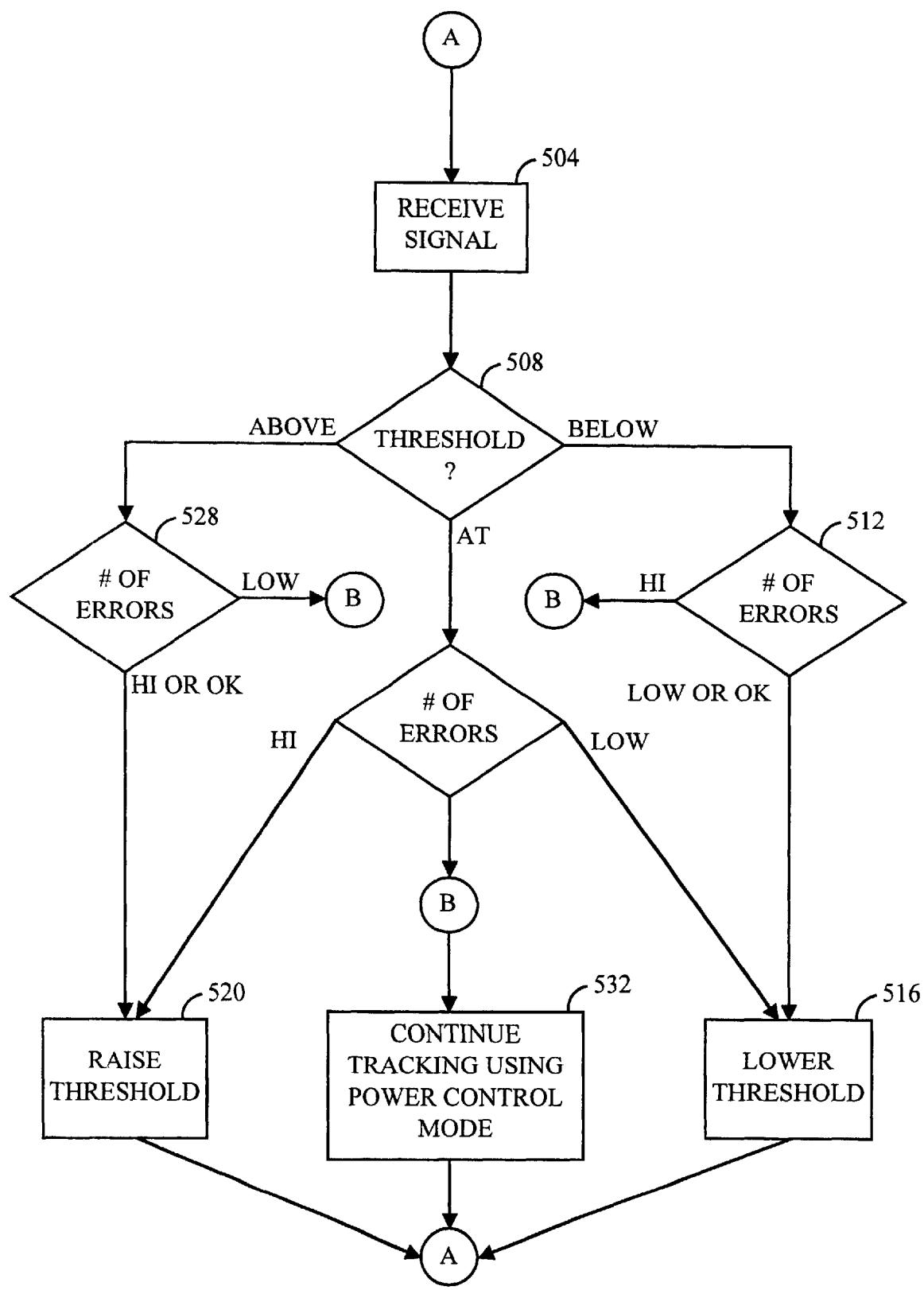
FIG. 5 is an operational flow diagram illustrating a process by which the invention determines whether or not to increase the threshold level according to one alternative embodiment of the invention.

FIG. 5 is a diagram illustrating a process by which the invention determines whether or not to increase the threshold level according to one alternative embodiment of the invention. Referring now to FIG. 5, in a step 504, receiver 112 receives a signal from transmitter 108 and evaluates the signal parameters. As described above, in the preferred embodiment, these parameters are SNR 208 and the number of frame errors received in the last N frames. For ease of description, the process is described in terms of these parameters even though other parameters can be substituted as described above.

In a step 508, the invention determines whether or not the system is operating at or sufficiently near threshold 204. The invention next determines whether or not the number of errors is acceptable, above normal, or below normal.

If the error rate is above normal and the system is operating at or near threshold 204, threshold 204 is increased as illustrated by steps 508, 524, and 520.

If the error rate is below normal and the system is operating at or near threshold, threshold 204 is lowered as illustrated by steps 508, 524, and 516.

If the error rate is normal and the system is operating nominally with respect to threshold, threshold 204 does not need to be adjusted, and the system continues to adjust power in the power control mode as needed. This is illustrated by steps 508, 524, and 532.

If the error rate is above normal and the system is operating above threshold 204, threshold 204 is increased. This is illustrated by steps 508, 528, and 520.

If the error rate is below normal and the system is operating above threshold, threshold 204 is not adjusted, and the power is decreased according to the power control mode. This is illustrated by steps 508, 528, and 532.

If the error rate is below normal and the system is operating below threshold 204, threshold 204 is lowered as illustrated by steps 508, 512, and 516.

If the error rate is above normal and the system is operating below threshold 204, threshold 204 is not adjusted, and the power is increased according to the power control mode. This is illustrated by steps 508, 512, and 532.

V. Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A method for adjusting a threshold level in a communication system having at least one mode for controlling the power of a transmitter in the communication system during system operation, comprising the steps of:
   determining performance of the communication system based on a predetermined metric;
   determining the power of the transmitter in the communication system in relation to the threshold of the communication; and
   adjusting a value of the threshold based on said performance of the communication system and the power of the transmitter in relation to said threshold.

2. The method of claim 1, wherein said step of adjusting comprises the step of increasing said threshold of the communication system when the system is operating at or near threshold, and the performance of the system is below acceptable levels.

3. The method of claim 1, wherein said step of adjusting comprises the step of decreasing the threshold of the communication system when the system is operating at or near threshold and the performance of the system is above acceptable levels.

4. The method of claim 1, wherein said predetermined metric is one of the group of error rate of the system, frame error rate, number of consecutive frame errors, and bit error rate.

5. The method of claim 1, wherein said step of determining performance of the communication system further comprises the step of determining whether a parameter of the communication system is within a defined range.

6. The system of claim 5, wherein said parameter is chosen from the group comprising signal-to-noise ratio, received signal strength, frame error rate frequency, number of consecutive frame errors, and bit-error rate.

7. The method of claim 5, further comprising the step of selecting modes of power control based on said determination of said parameter being within a range.

8. The method of claim 7, further comprising the step of adjusting the power of the transmitter according to a selected power control mode of the communication system.

9. The method of claim 8, wherein said adjustments in power are incremental power increases.

10. The method of claim 7, wherein said step of selecting modes of power control is performed at the transmitter.

11. The method of claim 7, wherein said step of selecting modes of power control is performed at a receiver location and further comprises a step of transmitting a command from the receiver location to the transmitter to select a desired power control mode.

12. Apparatus for adjusting a threshold level in a communication system having at least one mode for controlling the power of a transmitter in the communication system during system operation, comprising:
   means for determining performance of the communication system based on a predetermined metric;
   means for determining a power of the transmitter in the communication system in relation to said threshold; and
   means for adjusting a value of the threshold based on said performance of the communication system and the power of the transmitter in relation to said threshold.

13. The apparatus of claim 12, wherein said performance of the communication system is measured according to one or more of the group comprising signal-to-noise ratio, received signal strength, frame error rate frequency, number of consecutive frame errors, and bit-error rate.

14. The apparatus of claim 12, wherein said means for determining performance of the communication system comprises means for determining whether a transmitted signal is at, above or below a threshold level.

15. The apparatus of claim 12, wherein said means for determining performance of the communication system comprises means for determining whether a parameter of the communication system is within a defined range.

16. The apparatus of claim 15, wherein said parameter is chosen from the group comprising signal-to-noise ratio, received signal strength, frame error rate frequency, number of consecutive frame errors, and bit-error rate.

17. The apparatus of claim 15, further comprising means for selecting modes of power control based on said determination of said parameter being within a range.

18. The apparatus of claim 17, further comprising means for adjusting the power of the transmitter according to a selected power control mode of the communication system.

19. The apparatus of claim 17, wherein said means for selecting modes of power control is located at the transmitter.

20. The apparatus of claim 17, wherein said means for selecting modes of power control is located at a receiver location and further comprising means for transmitting a command from the receiver location to the transmitter to select a desired power control mode.

21. The method of claim 1, wherein said step of determining the power comprises determining whether the system is operating at or near threshold, and said adjusting step comprises adjusting the value of the threshold based on an outcome of said step of determining whether the system is operating at or near threshold.

22. The method of claim 1, wherein said adjusting step comprises the steps of:

adjusting the value of the threshold when said system is operating at or near threshold and the performance of the system is one of above and below acceptable levels; and otherwise maintaining the value of the threshold.

23. The method of claim 1, further comprising the step of:

maintaining the value of the threshold when said performance of the system is below acceptable levels and the system is not operating at or near threshold.

24. The method of claim 1, further comprising the step of:

maintaining the value of the threshold when said performance of the system is below acceptable levels and the system is operating at or near threshold.

25. The method of claim 1, wherein said adjusting step comprises the steps of:

adjusting the value of the threshold when said system is operating at or near threshold and the performance of the system is one of above and below acceptable levels, said system is operating below threshold and the performance of the system is one of above and at acceptable levels, and said system is operating above threshold and the performance of the system is one of below and at acceptable levels; and otherwise maintaining the value of the threshold.

26. The apparatus of claim 12, wherein said power determining means is adapted to determine whether the system is operating at or near threshold, and said means for adjusting is adapted to adjust the value of the threshold based on an output of said power determining means indicating whether the system is operating at or near threshold.

27. The apparatus of claim 12, wherein said adjusting means is adapted to:

adjust the value of the threshold when said system is operating at or near threshold and the performance of the system is one of above and below acceptable levels, and otherwise maintain the value of the threshold.

28. The apparatus of claim 12, further comprising:

means for maintaining the value of the threshold when said performance of the system is below acceptable levels and the system is not operating at or near threshold.

29. The apparatus of claim 12, further comprising:

means for maintaining the value of the threshold when said performance of the system is below acceptable levels and the system is operating at or near threshold.

30. The apparatus of claim 12, wherein said adjusting means is adapted to adjust the value of the threshold when said system is operating at or near threshold and the performance of the system is one of above and below acceptable levels, said system is operating below threshold and the performance of the system is one of above and at acceptable levels, and said system is operating above threshold and the performance of the system is one of below and at acceptable levels, and otherwise maintain the value of the threshold.

* * * * *